United States Patent [19]

Knapp

[11] Patent Number: 5,121,171
[45] Date of Patent: Jun. 9, 1992

[54] HYBRID COLOR PRINTING MACHINE

[75] Inventor: John F. Knapp, Fairport, N.Y.

[73] Assignee: Xerox Corporation, Stamford, Conn.

[21] Appl. No.: 638,966

[22] Filed: Jan. 9, 1991

[51] Int. Cl.$^5$ ...................... G03G 15/01; G03G 15/16
[52] U.S. Cl. .................................. 355/326; 355/271; 346/157
[58] Field of Search ............... 355/202, 244, 326, 327, 355/271, 272; 345/157

[56] References Cited

U.S. PATENT DOCUMENTS

| | | | |
|---|---|---|---|
| 3,970,042 | 7/1976 | Rees | 118/645 |
| 4,580,889 | 4/1986 | Hiranuma et al. | 355/327 |
| 4,593,991 | 1/1986 | Aoki et al. | 355/327 |
| 4,796,050 | 1/1989 | Furuta et al. | 355/317 |
| 4,803,518 | 2/1989 | Haneda et al. | 355/265 |
| 4,899,196 | 2/1990 | Mahoney | 355/271 |
| 4,927,724 | 5/1990 | Yamamoto et al. | 430/45 |
| 4,935,787 | 6/1990 | Maeda et al. | 355/326 |
| 5,008,691 | 4/1991 | Kumasaka et al. | 346/157 |

FOREIGN PATENT DOCUMENTS 62-38484  2/1987  Japan .................. 355/271

Primary Examiner—Joan H. Pendegrass
Attorney, Agent, or Firm—H. Fleischer; J. E. Beck; R. Zibelli

[57] ABSTRACT

A printing machine having a pair of photoconductive drums with a transfer roller interposed therebetween produces a full color document in two operating cycles. During the first operating cycle, a first color developed image is transferred from the first photoconductive drum to a sheet moving with the transfer roller. A second color developed image is transferred from the second photoconductive drum to the sheet in superimposed registration with the first developed image transferred thereto. During the second operating cycle, the foregoing process is repeated for a third color developed image and a fourth color developed image. In this way, a full color composite toner image is formed on the sheet.

7 Claims, 1 Drawing Sheet

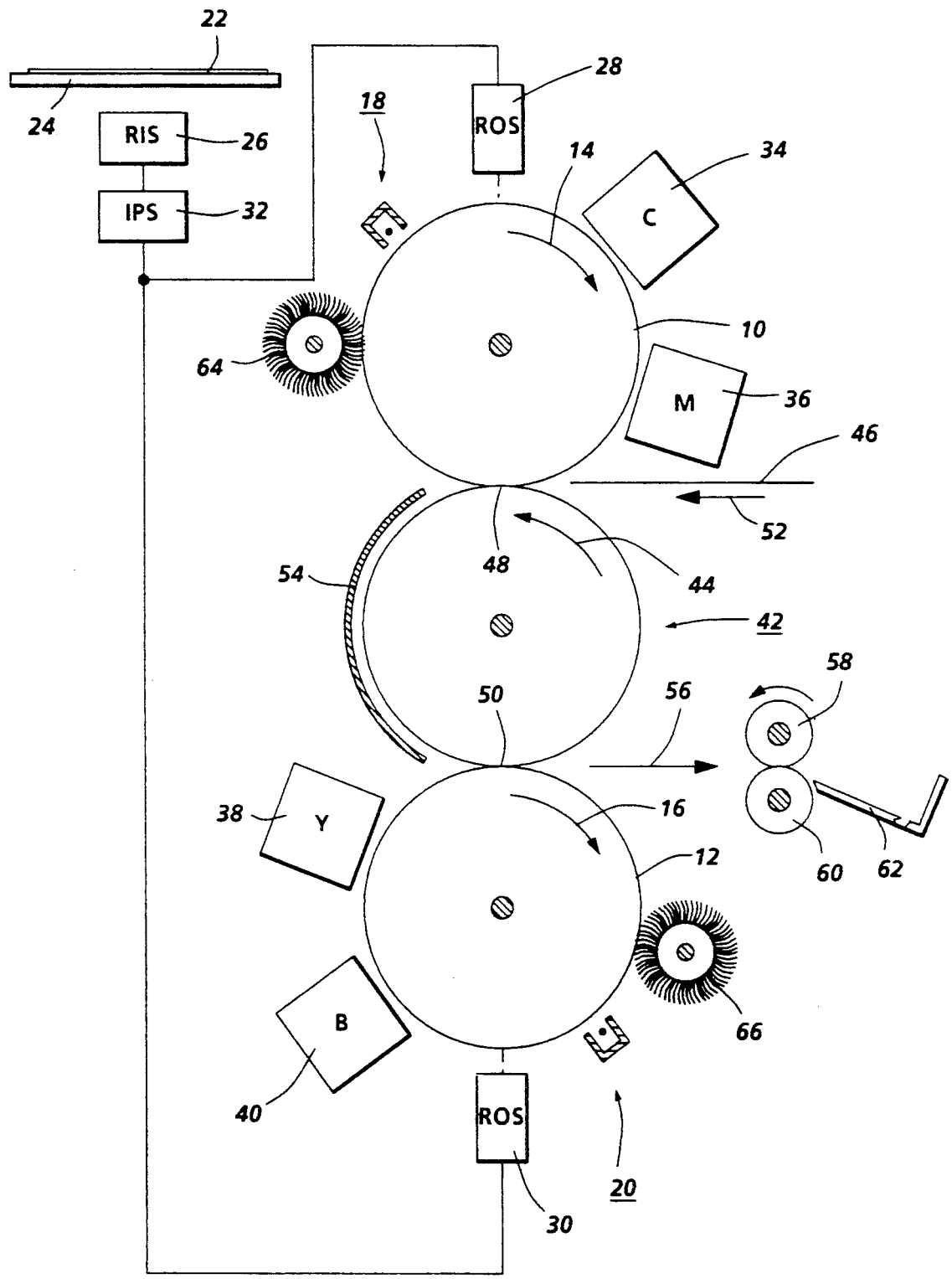

HYBRID COLOR PRINTING MACHINE

This invention relates generally to electrophotographic printing, and more particularly to a color electrophotographic printing machine.

In an electrophotographic printing machine, a photoconductive member is charged to a substantially uniform potential to sensitize the surface thereof. The charged portion of the photoconductive member is exposed. Exposure of the charged photoconductive member selectively dissipates the charge thereon in the irradiated areas. This records an electrostatic latent image on the photoconductive member corresponding to the informational areas contained within the original document being reproduced. After the electrostatic latent image is recorded on the photoconductive member, the latent image is developed by bringing toner into contact therewith. This forms a toner image on the photoconductive member which is subsequently transferred to a copy sheet. The copy sheet is heated to permanently affix the toner image thereto.

Multicolor electrophotographic printing is substantially identical to the foregoing process of mono-color printing. In one type of multicolor printing machine, referred to as cyclic multicolor printing, successive latent images corresponding to different colors are recorded on the photoconductive member during each cycle. Each single color electrostatic latent image is developed with toner of a color complementary thereto. This process is repeated a plurality of cycles for differently colored images and their respective complementary colored toner. Each single color toner image is transferred to the copy sheet in superimposed registration with the prior toner image. This creates a multi-layered toner image on the copy sheet. Thereafter, the multi-layered toner image is permanently affixed to the copy sheet creating a color copy. The developer material may be a liquid material or a powder material.

Alternatively, in another type of multicolor printing, referred to as tandem multicolor printing, a plurality of photoconductive members are used. A different single color electrostatic latent image is recorded on each photoconductive member. Each single color electrostatic latent is developed with toner of a color complementary thereto. A copy sheet advances past each photoconductive member. The toner image on each photoconductive member is transferred to the copy sheet in superimposed registration with one another. After all of the toner images have been transferred to the copy sheet, the multi layered toner image is fused to the copy sheet.

It is clear that there are two fundamental classes of color electrophotographic printing machines, i.e. cyclic or tandem. As previously indicated, a typical cyclic printing machine uses a single printing engine having multiple imaging, development and transfer cycles. The toner images are transferred directly to the sheet or to an intermediate with all of the toner images then being transferred to the sheet. A typical tandem printing machine uses multiple printing engines to transfer, in one cycle, different color toner images directly to a sheet or to an intermediate for subsequent transfer to the sheet. The primary advantages of a cyclic printing machine are less parts and reduced costs. The primary advantage of a tandem printing machine is printing rate since all colors are being printed simultaneously. A tandem printing machine prints at a rate of about four times the printing rate of a cyclic printing machine. However, a tandem printing machine cost approximately four times as much as a cyclic printing machine. The following disclosures appear to be relevant to various aspects of the present invention:

U.S. Pat. No. 3,970,042.
Patentee: Rees.
Issued: Jul. 20, 1976.
U.S. Pat. No. 4,593,991.
Patentee: Aoki et al.
Issued: Jun. 10, 1986.
U.S. Pat. No. 4,796,050.
Patentee: Furuta et al.
Issued: Jan. 3, 1989.
U.S. Pat. No. 4,803,518.
Patentee: Haneda et al.
Issued: Feb. 7, 1989.
U.S. Pat. No. 4,899,196.
Patentee: Mahoney.
Issued: Feb. 6, 1990.
U.S. Pat. No. 4,927,724.
Patentee: Yamamoto et al.
Issued: May 22, 1990.
U.S. Pat. No. 4,935,787.
Patentee: Maeda et al.
Issued: Jun. 19, 1990.

The relevant portions of the foregoing disclosures may be briefly summarized as follows:

U.S. Pat. No. 3,970,042 discloses a developer roll adapted to deposit different color developer material onto an electrostatic latent image recorded on the photoconductive drum and another developer roll adapted to deposit black developer material directly onto the electrostatic latent image recorded on the photoconductive drum. Developer beds having different color developer material are positioned adjacent the first mentioned developer roll. A black developer bed is positioned adjacent the second mentioned developer roller.

U.S. Pat. No. 4,593,991 describes a cyclic printing machine in which a sheet moves in a recirculating path and successive different color toner images are transferred thereto from a photoconductive drum.

U.S. Pat. Nos. 4,796,050 and 4,803,518 disclose a tandem printing machine having a plurality of photoconductive drums arranged such that color separated light images of an original document are recorded thereon as electrostatic latent images. The latent images are developed into visible colored images. A conveyor advances a sheet past each photoconductive drum. The visible colored images are transferred from each photoconductive drum to the sheet.

U.S. Pat. Nos. 4,899,196 and 4,935,787 describe a printing machine in which successive different color toner images are transferred from a photoconductive member to an intermediate member forming a composite color image thereon. The composite color image is transferred from the intermediate member to a sheet.

U.S. Pat. No. 4,927,724 discloses a color printing machine in which a composite toner image having different color toners is formed on a photoconductive member in a single pass. The composite color image is transferred to a sheet.

In accordance with one aspect of the present invention, there is provided a printing machine including a first member and a second member. Means are provided for recording a first latent image on the first member and a second latent image on the second member during a first operating cycle. Means develop the first latent image recorded on the first member with developer material of a first color and the second latent image recorded on the second member with developer material of a second color during the first operating cycle. The developer material colors are different from one another so as to form a first developed image on the first member and a second developed image on the second member during the first operating cycle. Means transfer the first developed image from the first member to a receiving member and the second developed image from the second member to the receiving member during the first operating cycle.

Pursuant to another aspect of the present invention, there is provided an electrophotographic printing machine including a first photoconductive member and a second photoconductive member. Means are provided for recording a first latent image on the first photoconductive member and a second latent image on the second photoconductive member during a first operating cycle. Means develop the first latent image recorded on the first photoconductive member with developer material of a first color and the second latent image recorded on the second photoconductive member with developer material of a second color during the first operating cycle. The developer material colors are different from one another so as to form a first developed image on the first photoconductive member and a second developed image on the second photoconductive member during the first operating cycle. Means transfer the first developed image from the first photoconductive member to a sheet and the second developed image from the second photoconductive member to the sheet during the first operating cycle.

Other features of the present invention will become apparent as the following description proceeds and upon reference to the figure which shows a schematic elevational view of a color electrophotographic printing machine incorporating the features of the present invention therein.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

In the FIGURE, like reference numerals have been used throughout to designate identical elements. The FIGURE is an elevational view of an electrophotographic printing machine incorporating the features of the present invention therein. It will become evident from the following discussion that the present invention is equally well suited for use in a wide variety of printing machines, and is not necessarily limited in its application to the particular configuration shown herein.

Referring now to the FIGURE, there is shown the electrophotographic printing machine employing a first photoconductive drum 10 and a second photoconductive drum 12. Preferably, each of the photoconductive drums is made from a selenium alloy coated on a conductive substrate. Drum 10 rotates in the direction of arrow 14 to advance successive portions of the photoconductive surface sequentially through the various processing stations disposed about the path of movement thereof. Similarly, drum 12 rotates in the direction of arrow 16 to advance successive portions of the photoconductive surface sequentially through the various processing stations disposed about the path of movement thereof.

Initially, a portion of photoconductive drum 10 passes through the charging station. At the charging station, a corona generating device, indicated generally by the reference numerals 18, charges photoconductive drum 10 to a relatively high, substantially uniform potential. Substantially simultaneously, a corona generating device, indicated generally by the reference numerals 20, charges photoconductive drum 12 to a relatively high, substantially uniform potential.

Next, the charged photoconductive drums are rotated to the exposure station. At the exposure station, original document 22 is positioned on transparent platen 24. The exposure station includes a raster input scanner (RIS) 26, raster output scanners (ROS) 28 and 30, and an image processing system (IPS) 32. The RIS has document illumination lamps, optics, a scanning drive, and photosensing elements, such as a CCD array, i.e. a charge coupled device. The RIS uses a CCD array having approximately 1200 sites/inch in which a repeating pattern of red, green and blue filters are masked directly onto the chip. The RIS scans the original document one line at a time generating signals with each signal being representative of at least one color component in original document 22. The RIS captures the entire image from the original document 22 and converts it to a series of raster scan lines which are transmitted as electrical signals to IPS 32. The electrical signals from the RIS correspond to red, green and blue intensities at each point in the document. The IPS compares the red, blue and green intensities for each pixel in the original document. When the intensity levels for the red, green and blue pixels are in a preselected relationship to one another, e.g. about equal to one another, the pixel will be developed as black. Those pixels wherein at least one of the intensities for the red, green and blue signals do not correspond to the preselected relationship will be developed with developer material of the appropriate color. The signals from IPS 32 are transmitted to ROS 28 and ROS 30. Each ROS includes a laser with a rotating polygon mirror. ROS 28 illuminates the charged portion of photoconductive drum 10 to selectively discharge areas of the photoconductive drum to record two successive electrostatic latent latent images on photoconductive drum 10. During the first operating cycle, i.e. during the first rotation of drum 10 through a complete revolution, the red areas of the charged portion of photoconductive drum 10 are discharged. ROS 30 illuminates the charged portion of photoconductive drum 12 to selectively discharge areas of the photoconductive surface to record two successive electrostatic latent latent images on photoconductive drum 12. During the first operating cycle, i.e. during the first rotation of drum, 12 through a complete revolution, the blue areas of the charged portion of photoconductive drum 12 are discharged. During the second operating cycle, i.e. during the second rotation of drum, 10 through a complete revolution, ROS 28 illuminates the charged portion of photoconductive drum 10 to discharge the green areas. ROS 30 illuminates the charged portion of photoconductive drum 12 to selectively discharge the white areas of the charged portion of photoconductive drum 12. Thus, during the first operating cycle, a red electrostatic latent image is recorded on photoconductive drum 10 and a a blue electrostatic latent image on photoconductive drum 12. During the second operating cycle, a green electrostatic latent image is recorded on drum 10 and a black electrostatic latent image on drum 12.

After the electrostatic latent images have been recorded on photoconductive drums 10 and 12 during the first operating cycle, the drums advance the electrostatic latent images to their respective development stations. Each development station includes two individual developer units for a total of four individual developer units. The developer units are indicated by the reference numerals 34, 36, 38 and 40. Each developer unit is of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer particles are continually moving so as to provide the brush consistently with fresh developer material. Development is achieved by bringing the brush of developer material into contact with the photoconductive surface. Developer units 34, 36, and 38, respectively, apply toner particles of a specific color which corresponds to the complement of the specific color of the latent image recorded on the photoconductive surface. The color of each of the toner particles is adapted to absorb light within a preselected spectral region of the electromagnetic wave spectrum. For example, the electrostatic latent image formed by discharging the red areas is made visible by having developer unit 34 apply red absorbing (cyan) toner particles thereon. Similarly, the blue discharged areas are developed by developer unit 38 with blue absorbing (yellow) toner particles, while the green discharged areas are developed by developer unit 36 with green absorbing (magenta) toner particles. Developer unit 40 contains black toner particles and is used to develop the electrostatic latent image corresponding to the black regions of the original document. Each of the developer units is moved into and out of the operative position. In the operative position, the magnetic brush is closely adjacent the photoconductive drum. In the non-operative position, the magnetic brush is spaced from the photoconductive drum. During the first operating cycle, developer unit 34 develops the red electrostatic latent image recorded on photoconductive drum 10 with cyan toner particles. Developer unit 38 develops the blue electrostatic latent image recorded on photoconductive drum 12 with yellow toner particles. At this time, developer units 36 and 40 are non-operative. During the second operating cycle, developer unit 36 develops the green electrostatic latent image recorded on photoconductive drum 10 with magenta toner particles. Developer unit 40 develops the black electrostatic latent image recorded on photoconductive drum 12 with black toner particles. At this time, developer units 34 and 38 are non-operative.

After development, the toner image on each photoconductive drum is moved to the transfer station where the toner images are transferred to a sheet of support material 46, such as plain paper amongst others, in superimposed registration with one another. One skilled in the art will appreciate that, alternatively, the toner images may be transferred to an intermediate member to form a composite toner image thereon which is subsequently transferred to the sheet of support material. A transfer roller, indicated generally by the reference numeral 42 is interposed between drums 10 and 12. Transfer roller 42 rotates in the direction of arrow 44. Sheet 46 is advanced from a stack of sheets disposed on a tray. A feed roll advances the uppermost sheet, in the direction of arrow 52, from the stack of sheets in synchronism with the movement of a gripper on transfer roller 42. In this way, the leading edge of the sheet arrives at a preselected position to be received by the open gripper. The gripper then closes securing the sheet thereto for movement with transfer roller 42 in a recirculating path. The leading edge of the sheet is secured releasably by the gripper. Transfer roller 42 rotates in synchronism with the rotation of drums 10 and 12. In this way, sheet 46 moves into contact with the photoconductive drum 10, in synchronism with the toner image developed thereon, in transfer zone 48. Transfer roller 42 is electrically biased to a suitable magnitude and polarity so as to attract the toner image from photoconductive drum 10 to sheet 46. The sheet remains secured to the gripper so as to continue to move with transfer roller 42. Drum 12 also rotates in synchronism with transfer roller 42. In this way, sheet 46 moves into contact with the photoconductive drum 12, in synchronism with the toner image developed thereon, in transfer zone 50. The toner image is transferred from photoconductive drum 12 to sheet 46 at transfer zone 50 in superimposed registration with the toner image previously transferred thereto from photoconductive drum 10 at transfer zone 48. Thus, during the first operating cycle, the cyan toner image and the yellow toner image are transferred to sheet 46 in superimposed registration with one another. Sheet 46 remains secured to transfer roller 42 during the second operating cycle. The second operating cycle is the same as the first operating cycle with the only distinction being the color of the toner images transferred to sheet 46. During this cycle, a magenta toner image is transferred at transfer zone 48 to sheet 46, in superimposed registration with the toner images transferred thereto during the first operating cycle. Finally, a black toner image is transferred, in superimposed registration with the previously transferred toner images, to sheet 46 at transfer zone 50 to complete the formation of the composite toner image. An arcuate baffle 54 is positioned adjacent a portion of transfer roller 42 to guide the trailing edge of sheet 46 as it moves with transfer roller 42.

After the last transfer operation, the grippers open and release the sheet. Conveyors (not shown) transport the sheet, in the direction of arrow 56 to the fusing station where the composite toner image is permanently fused to the sheet. The fusing station includes a heated fuser roll 58 and a pressure roll 60. The sheet passes through the nip defined by fuser roll 58 and pressure roll 60. The toner image contacts fuser roll 58 so as to be affixed to the sheet. Thereafter, the sheet is advanced to catch tray 62 for subsequent removal therefrom by the machine operator.

The last processing station in the direction of movement of drums 10 and 12, as indicated by arrows 14 and 16, respectively, is the cleaning station. A rotatably mounted fibrous brush 64 is positioned in the cleaning station and maintained in contact with photoconductive drum 10 to remove residual toner particles remaining after the transfer operation. Similarly, a rotatably mounted fibrous brush 66 is positioned in the cleaning station and maintained in contact with photoconductive drum 12 to remove residual toner particles remaining after the transfer operation. Thereafter, a lamp illuminates each photoconductive drums to remove any residual charge remaining thereon prior to the start of the next successive cycle.

One skilled in the art will appreciate that only one cycle is required when printing a copy having only black and cyan or black and magenta. In addition, the black toner particles may be magnetic and so as to be used in magnetic ink character recognition (MICR) systems.

In recapitulation, the color electrophotographic printing machine of the present invention forms a full color document in two passes or highlight color in a single pass. A transfer roller is interposed between a pair of photoconductive drums. A sheet rotates with the transfer roller in synchronism with the photoconductive drums. During the first pass, i.e. operating cycle, two different color toner images are transferred to the sheet in superimposed registration with one another. After completion of the first pass, the sheet remains secured to the transfer roller to continue rotating therewith during the second operating cycle. During the second pass, two other different color toner images are transferred to the sheet in superimposed registration with the toner images previously transferred thereto. In this way, a full color composite toner image is formed in two operating cycles.

It is, therefore, apparent that there has been provided in accordance with the present invention, a printing machine that forms a full color document in two passes. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. An electrophotographic printing machine, including:

a first photoconductive drum;

a second photoconductive drum;

means for recording a first electrostatic latent image on said first photoconductive drum and a second electrostatic latent image on said seamed photoconductive drum during a first operating cycle;

means for developing the first electrostatic latent image recorded on said first photoconductive drum with developer material of a first color and the second electrostatic latent image recorded on said second photoconductive drum during the first operating cycle with developer material of a second color with the developer material colors being different from one another so as to form a first developed image on said first photoconductive drum and a second developed image on said second photoconductive drum during the first operating cycle; and a transfer roller interposed between said first photoconductive drum and said second photoconductive drum defining a nip between said first photoconductive drum and said transfer roller and said second photoconductive drum and said transfer roller with the receiving member advancing through the nips defined thereby, said transfer roller rotating in synchronism with said first photoconductive drum and said second photoconductive drum so as to transfer the developed images to the receiving member in registration with one another during the first operating cycle.

2. An electrophotographic printing machine, including:

a first photoconductive drum;

a second photoconductive drum;

means for recording a first electrostatic latent image on said first photoconductive drum and a second electrostatic latent image on said second photoconductive drum during a first operating cycle and for recording a third electrostatic latent image on said first photoconductive drum and a fourth electrostatic latent image on said second photoconductive drum during a second operating cycle;

means for developing the first electrostatic latent image recorded on said first photoconductive drum with developer material of a first color and the second electrostatic latent image recorded on said second photoconductive drum with developer material of a second color during the first operating cycle and for developing the third electrostatic latent image on said photoconductive drum with developer material of a third color and the fourth electrostatic latent image on said second photoconductive drum with developer material of a fourth color during a second operating cycle with the developer material colors being different from one another so as to form a first developed image on said first photoconductive drum and a second developed image on said second photoconductive drum during the first operating cycle and to form a third developed image on said first photoconductive drum and a fourth developed image on said second photoconductive drum during the second operating cycle; and a transfer roller interposed between said first photoconductive drum and said second photoconductive drum so as to define nips therebetween with the receiving member moving therewith through the nips, said transfer roller rotating in synchronism with said first photoconductive drum and said second photoconductive drum so as to transfer the developed images to the receiving member in registration with one another during the first and second operating cycles.

3. A printing machine according to claim 2, wherein said developing means includes:

a first developer unit positioned adjacent said first photoconductive member to deposit developer material of the first color on the first electrostatic latent image recorded thereon;

a second developer unit positioned adjacent said second photoconductive member to deposit developer material of the second color on the second electrostatic latent image recorded thereon;

a third developer unit positioned adjacent said first photoconductive member to deposit developer material of a third color on the third electrostatic latent image to form a third developed image thereon; and a fourth developer unit positioned adjacent said second photoconductive member to deposit developer material of a fourth color on the fourth electrostatic latent image to form a fourth developed image thereon.

4. A printing machine according to claim 3, wherein said receiving member includes a sheet.

5. A printing machine according to claim 4, wherein said transfer roller rotates through two operating cycles with the sheet secured thereto so as to transfer the developed images to the sheet during the first operating cycle. and the third developed image and the fourth developed image to the sheet during the second operating cycle.

6. A printing machine according to claim 5, further including means for fusing the developed images transferred to the sheet.

7. A printing machine according to claim 6, wherein said recording means includes:
- means for charging at least a portion of said first photoconductive drum and said second photoconductive drum; and
- means for selectively discharging the charged portions of said first photoconductive drum and said second photoconductive drum to record electrostatic latent images thereon.

* * * * *